United States Patent [19]

Blizzard

[11] Patent Number: 4,640,091
[45] Date of Patent: Feb. 3, 1987

[54] APPARATUS FOR IMPROVING ACCELERATION IN A MULTI-SHAFT GAS TURBINE ENGINE

[75] Inventor: Cyril A. M. Blizzard, Greenfield Park, Canada

[73] Assignee: Pratt & Whitney Canada Inc., Longueuil, Canada

[21] Appl. No.: 817,056

[22] Filed: Jan. 8, 1986

Related U.S. Application Data

[62] Division of Ser. No. 574,387, Jan. 27, 1984, Pat. No. 4,590,759.

[51] Int. Cl.⁴ .............................................. F02C 9/16
[52] U.S. Cl. .................................................. 60/39.29
[58] Field of Search .......................... 60/39.161, 39.29; 415/53 R, 116; 251/61.2

[56] References Cited

U.S. PATENT DOCUMENTS

| | | |
|---|---|---|
| 2,825,532 | 3/1958 | Kadosch et al. |
| 2,944,729 | 7/1960 | Foley et al. |
| 3,032,313 | 5/1962 | Szydlowski. |
| 3,041,848 | 7/1962 | Greenwald. |
| 3,360,189 | 12/1967 | Cook. |
| 3,643,675 | 2/1972 | Wetterstad ........................ 415/116 |
| 3,657,881 | 4/1972 | Amann et al. ................... 60/39.161 |
| 3,751,909 | 8/1973 | Kohler et al. ...................... 415/115 |
| 4,222,703 | 9/1980 | Schaum et al. ................... 415/53 R |
| 4,280,678 | 7/1981 | Roberts. |

FOREIGN PATENT DOCUMENTS

| | | |
|---|---|---|
| 0082578 | 6/1983 | European Pat. Off. |
| 1108010 | 5/1961 | Fed. Rep. of Germany. |
| 1263010 | 4/1961 | France. |
| 2103560 | 4/1972 | France. |
| 428072 | 7/1967 | Switzerland. |
| 944714 | 12/1963 | United Kingdom. |

OTHER PUBLICATIONS

"The Use of Compressor-Inlet Prewhirl for the Control of Small Gas Turbines," No. 63-AHGT-55, published Jan. 14, 1963.

Primary Examiner—Louis J. Casaregola
Attorney, Agent, or Firm—Schwartz, Jeffery, Schwaab, Mack, Blumenthal & Evans

[57] ABSTRACT

A free turbine, gas turbine engine provided with a pre-swirl arrangement in the compressor, based on bleeding air from the compressor and using the bleed air as a pre-swirl device upstream of the compressor to increase its rotational speed. A governor device, driven from the compressor rotor, controls the amount of pre-swirl bleed air to maintain a constant compressor speed from minimum to maximum power. Compressor rotor and gas inertia effects during acceleration are thus eliminated.

5 Claims, 3 Drawing Figures

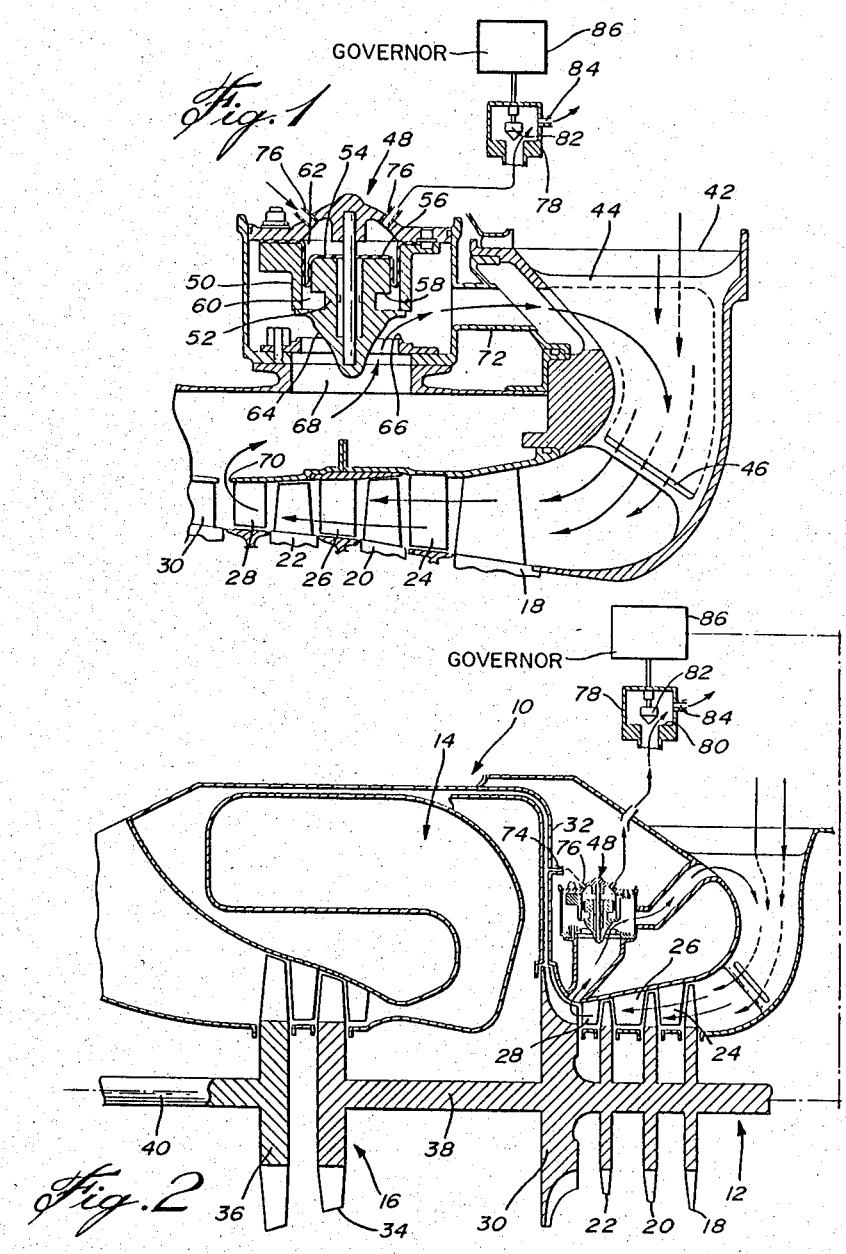

APPARATUS FOR IMPROVING ACCELERATION IN A MULTI-SHAFT GAS TURBINE ENGINE

CROSS-REFERENCE TO RELATED APPLICATION

This application is a divisional of United States application, Ser. No. 574,387, filed Jan. 27, 1984 U.S. (Pat. No. 4,590,759).

BACKGROUND OF THE INVENTION

1. Field of the Invention

The present invention relates to a turbine engine, and particularly to an engine having a free turbine and provided with a compressor pre-swirl configuration.

2. Description of the Prior Art

It has been found that a conventional free turbine or multi-shaft gas turbine engine, when utilized with an electrical generator or utilized in similar auxiliary power systems, suffers from having a relatively slow response time when it is required to accelerate from minimum power conditions. In such a situation involving multi-shaft engines, the electrical generator is mechanically coupled to the power turbine rotor or rotors. Since the compressor shaft is independent of the power shaft, there is a lapse of time before the compressor will respond to develop the higher speed required from an engine minimum power condition to a maximum power condition. At low power requirements, although the power turbine shaft may rotate at a high relative speed, the compressor rotor speed, air mass flow and fuel flow is low. When a load is sensed by the engine, the compressor must accelerate to a higher speed by introducing more fuel to the combustor before a suitable air mass flow and gas horsepower can be produced to meet the new power requirements.

In a single shaft gas turbine configuration, the same shaft is mechanically coupled to the electrical generator and carries the power turbine rotors and the compressor rotors. Thus, the compressor responds rapidly to an increase in load since the power changes from minimum to maximum require only a change in fuel flow rate. A single shaft, however, has disadvantages, such as high starting torques and difficulties in matching compressor rotor speed to generator speed to provide optimum performance.

A free turbine engine is any gas turbine engine where the compressor shaft and the turbine power drive shaft are not mechanically connected or coupled. Free turbine gas turbine engines are frequently used in helicopter applications. Similarly, a sudden power demand is frequently made on the engine which, in the case of a landing, would be operated at low power requirements, that is, the helicopter rotor rotates at a constant velocity but with near-zero pitch. Just prior to touching down, the pitch of the rotor blades is increased in order to reduce the rate of descent to zero, thereby requiring an increase in the power output of the engine. However, due to the inherent delay in accelerating the compressor and thus the engine from minimum to maximum power, i.e., 3 to 5 seconds, the helicopter pilot must anticipate the fuel rate increase by the above time factor.

U.S. Pat. No. 4,222,703, issued to Schaum et al on Sept. 16, 1980 and assigned to Pratt & Whitney Aircraft of Canada Limited, describes an arrangement of a bleed valve adjacent the compressor communicating with hollow struts provided with a slot to form a jet flap preceding the compressor for the purpose of providing pre-swirl to the compressor by bleeding the compressor at an interstage location. This pre-swirl is utilized to improve stability of a free turbine engine at low power operation when the engine is designed for cruising performance levels.

SUMMARY OF THE INVENTION

It is an aim of the present invention to provide a solution to the problem of slow acceleration of the compressor inherent in free turbine engines, when used in constant output shaft speed applications, by utilizing the bleed pre-swirl concept described in Schaum et al in a unique combination whereby, at low power levels, the engine can be increased to maximum levels over a short period of time and simulate the response characteristics of a single shaft gas turbine engine without its inherent disadvantages.

A construction in accordance with the present invention comprises a multi-shaft gas turbine engine including at least a compressor shaft mounting a plurality of blade stages, and an output shaft mounting at least a turbine blade stage, and means for bleeding air from the compressor. A bleed valve including a cylinder and piston means within the cylinder is provided where the piston has first and second faces, the first face defining with said cylinder a first valve chamber and the second face defining with the cylinder a second chamber. The means for bleeding air from the compressor communicates with an inlet in the first valve chamber, and hollow pre-swirl members are provided upstream of said compressor. The pre-swirl members are each provided with jet flap means. An outlet is provided in the first valve chamber, and means communicates said outlet from said first valve chamber to the hollow pre-swirl members. Means are provided for communicating a high pressure air source downstream of the compressor to an inlet in the second valve chamber and an outlet is provided in the second valve chamber. A control valve is provided with a governor means operatively connected to the control valve and conduit means communicates the outlet in the second valve chamber to the control valve. Means connect the compressor shaft to the governor whereby, the minimum power requirements, the governor will maintain the control valve open thereby maintaining a low pressure in the second valve chamber, thus allowing the bleed valve to be opened thereby providing a pre-swirl to the compressor and maintaining the rotor velocity of the compressor to be matched with the power requirements of the load of the device connected to the turbine rotor on the power drive shaft. When an increased load is sensed, the governor will then modulate the closing of the control valve thus reducing said pressure in the second valve chamber, thereby allowing the bleed valve to reset to its new position and reduce the bleed valve flow, thus reducing the pre-swirl to thereby enable the compressor to maintain a constant speed. The change in power level is controlled by a second governor (not shown) which senses output shaft speed and adjusts the fuel flow to maintain this governed speed in the conventional manner.

A method of improving the acceleration of a free turbine engine in accordance with the present invention comprises the steps of bleeding air from the compressor, passing said bleed air to a pre-swirl station upstream of said compressor, thereby maintaining the compressor rotor velocity constant even with rapid power turbine rotor load variations.

An advantage of the present invention is the maintenance of a constant high rotor velocity of the compressor by the bleed and pre-swirl arrangement to thereby reduce the response time of the compressor after an increased load has been sensed. In a specific application, the increase in compressor rotor velocity was approximately 18%. For instance, in preliminary tests it was found that the speed of the engine could be increased from a low power to maximum power in 0.5 seconds as compared to 3 to 5 seconds without the arrangement described herein. Small refinements to this technique are expected to improve this acceleration time by a factor of 10.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary vertical cross-section taken through a portion of a compressor section of a typical gas turbine engine and illustrating certain elements in schematic;

FIG. 2 is a schematic view of the arrangement in accordance with the present invention.

DESCRIPTION OF THE PREFERRED EMBODIMENTS

Figure 3:
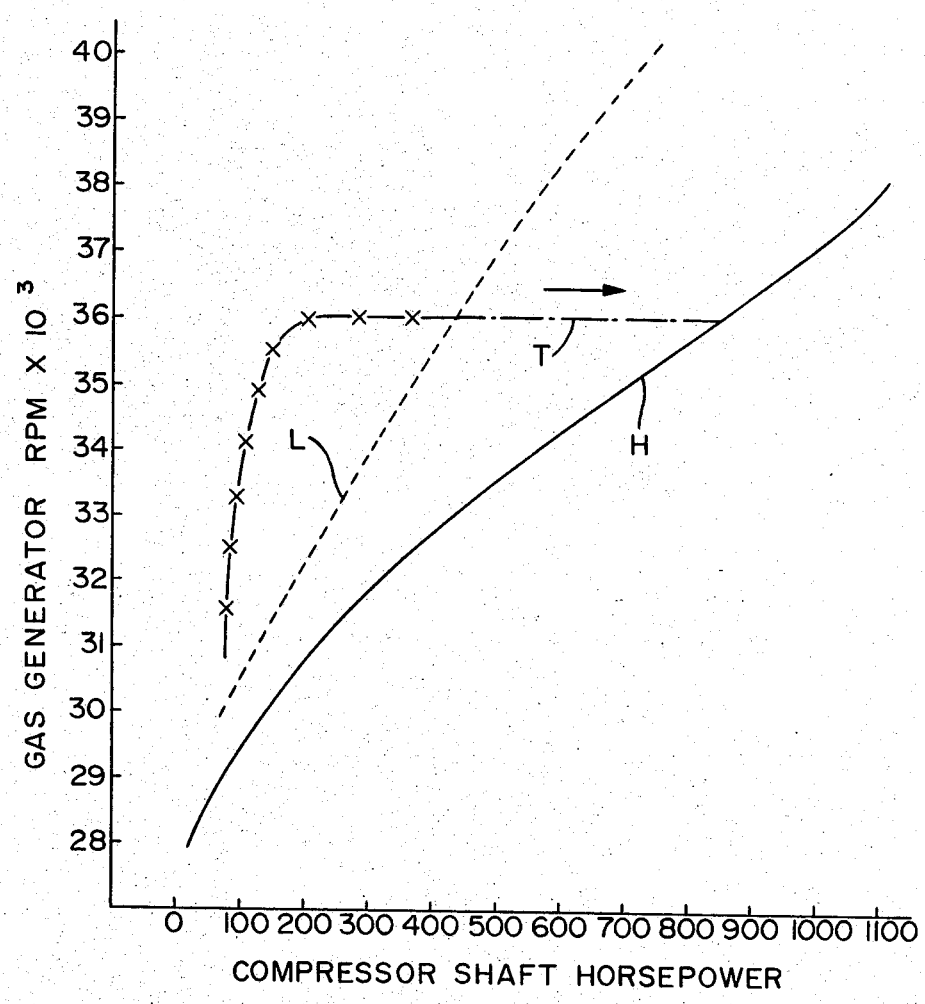
FIG. 3 is a graph illustrating performance ranges of a typical gas turbine engine embodying the present invention.

Reference will now be made to the drawings and particularly to FIGS. 1 and 2 thereof.

As shown in FIG. 2, a typical two-shaft gas turbine engine 10 is illustrated having a compressor section 12, a combustion chamber 14, and a turbine section 16. In this case, the compressor 12 has a series of rotor stages 18, 20 and 22 interspaced by stator stages 24, 26 and 28, leading to an impeller 30 and a pipe diffuser 32. The pipe diffuser 32 leads the compressed gases to the reverse flow combustion chamber 14 which in turn discharges the combustion gases through the turbine section 16 which includes, in this embodiment, a compressor drive turbine stage 34 and an output drive turbine stage 36. As illustrated in FIG. 2, the compressor drive turbine 34 is fixedly mounted to a compressor shaft 38 while the output drive turbine 36 is fixedly mounted to the output shaft 40.

The compressor section 12, as shown in FIG. 1, includes a radially arranged inlet 42 through which are provided a plurality of spaced-apart hollow struts 44. The struts 44 include a slot 46 at right angles to the direction of airflow within the inlet 42. The strut 44 and jet flap slot 46 are upstream from the first compressor stage 18.

A bleed valve 48 includes a cylinder 50 and a piston 52 provided with a diaphragm 54. The piston 52 has opposed faces 56 and 58 defined by the piston proper and the diaphragm 54, separating the cylinder into a first chamber 60 and a second chamber 62. The piston 52 includes a valve member 64 adapted to engage a valve seat 66 of port 68 which communicates with bleed ports 70 provided interstage of the compressor 12. In the present embodiment, the bleed ports 70 are provided between the stator blades 28 and the impeller 30. It is understood that this bleed may be provided at any location in the compressor including downstream of the impeller.

The valve 48 communicates through a conduit 72 with the hollow struts 44, and thus when the piston 64 is moved from the seat 66, pressured air bleeding from the bleed ports 70 passes through the conduit 72 into the hollow strut 44 and exits from the slot 46 defining a jet flap which, in the present case, is selected at roughly 30° to the flow, creating a pre-swirl in the inlet flow to the compressor.

As shown in FIG. 2, the second chamber 62 is connected to the pipe diffuser 32 by means of a conduit 74. The purpose of this conduit 74 is to bleed high pressure air downstream of the compressor into the second chamber 62. The second chamber 62 includes an inlet 76 communicating with a control valve 78. The control valve 78 includes, in the present case, a valve seat 80 and a plunger 82 as well as an outlet 84. The plunger 82 is moved by means of a governor 86 which is in turn connected, in the present embodiment, to the compressor shaft 38. It is contemplated that the governor can be operated by other devices which are sensitive to immediate power requirements due to increased load.

The governor 86, which is merely shown by a block in the drawings, may be any known device such as a mechanical centrifugal governor, an electronic device or solenoid control.

In operation, the control valve 78 is normally open, that is, the plunger 82 is removed from the valve seat 80 allowing the exit of air from the second chamber 62 of the bleed valve. Thus, the second chamber 62 is underpressured relative to the first chamber 60, thereby overcoming the pressure against the face 56 and thus forcing the piston 64 away from the valve seat 66. This allows the airflow through the bleed port 70 through the bleed valve 48 and, therefore, pre-swirl is provided through jet flap slot 46.

The engine in the present embodiment is designed to run at low power but at roughly 36,000 rpm. The pre-swirl provides that the compressor 12, without the present arrangement, would run, under low power conditions, at approximately 33,000 rpm. When a load is sensed by the governor 86, such as by the compressor shaft 38 slowing, the valve plunger 82 is gradually closed against the valve seat 80, thus allowing the high pressure air in the second chamber 62 to build up. The pressure in the second chamber 62, therefore, overcomes the pressure of the air bleeding from the interstage of the compressor proper through the bleed port 70, thus forcing the piston 64 to close on the valve seat 66 and gradually preventing bleed air from passing through to the hollow strut 44. The compressor shaft 38, therefore, can pass from a low power condition to a high power condition with only a change in fuel and with hardly a discernible change in speed, as shown on the graph in FIG. 3. The dotted line L represents the power curve with the pre-swirl in effect while the full line H represents the power curve without the pre-swirl. T illustrates the transition from low power to high power at constant speed as a result of increasing fuel flow and changing from the pre-swirl mode to a non pre-swirl mode.

It has been found in preliminary tests that the response time can be as low as 0.5 seconds from the sensing of the load as compared to 3 to 5 seconds' response under present conventional free gas turbine engines, since without the pre-swirl arrangement described above, the compressor, upon sensing a load, must build up its speed from, for example, 33,000 rpm to 36,000 rpm.

I claim:

1. A free turbine gas turbine engine comprising at least a compressor shaft mounting a plurality of blade stages, an output shaft mounting at least a turbine blade stage, means for bleeding air from the compressor, bleed valve means including a cylinder and piston means within the cylinder, the piston having first and second faces, the first face of the piston defining with the cylinder a first valve chamber and the second face defining with the cylinder a second chamber, said means for bleeding the compressor air communicating with an inlet in said first valve chamber, hollow pre-swirl members provided upstream of said compressor, said pre-swirl members each provided with means for forming a jet flap, an outlet provided in said first valve chamber, means communicating said outlet from said first valve chamber to said hollow pre-swirl members, means communicating a high pressure air source downstream of the compressor to an inlet in said second valve chamber, an outlet in said second valve chamber, a control valve, governor means operatively connected to said control valve, conduit means communicating said outlet in said second valve chamber to said control valve, load sensing means connected to the governor whereby, under minimum power requirements, said governor will maintain said control valve open thereby maintaining a low pressure in the second valve chamber thus maintaining said bleed valve open to provide a jet flap and thus a pre-swirl to the compressor, and when a load is being sensed, the governor will progressively close said control valve thus increasing said pressure in the second valve chamber, thereby closing the bleed valve and eliminating the pre-swirl to enable the compressor to provide a greater gas horsepower.

2. A gas turbine engine as defined in claim 1, wherein the pre-swirl members are provided with a slot at right angles to the flow thereby providing a jet flap at an optimum angle.

3. A gas turbine engine as defined in claim 1, wherein the bleed valve includes a flexible diaphragm on the piston providing the first and second surfaces between the first and second chambers of the valve.

4. A gas turbine engine as defined in claim 1, wherein the bleed ports are provided in the compressor and the compressor is of the type having an axial component and a radial component with an impeller turning the airflow from the axial component to the radial component, the bleed ports being immediately upstream of the impeller.

5. A gas turbine engine as defined in claim 1, wherein the air bleed ports are located just downstream of the compressor.

* * * * *